F. H. KERR.
FARM AND GARDEN TILLING MACHINE.
APPLICATION FILED DEC. 30, 1907.
926,498.
Patented June 29, 1909.
2 SHEETS—SHEET 1.
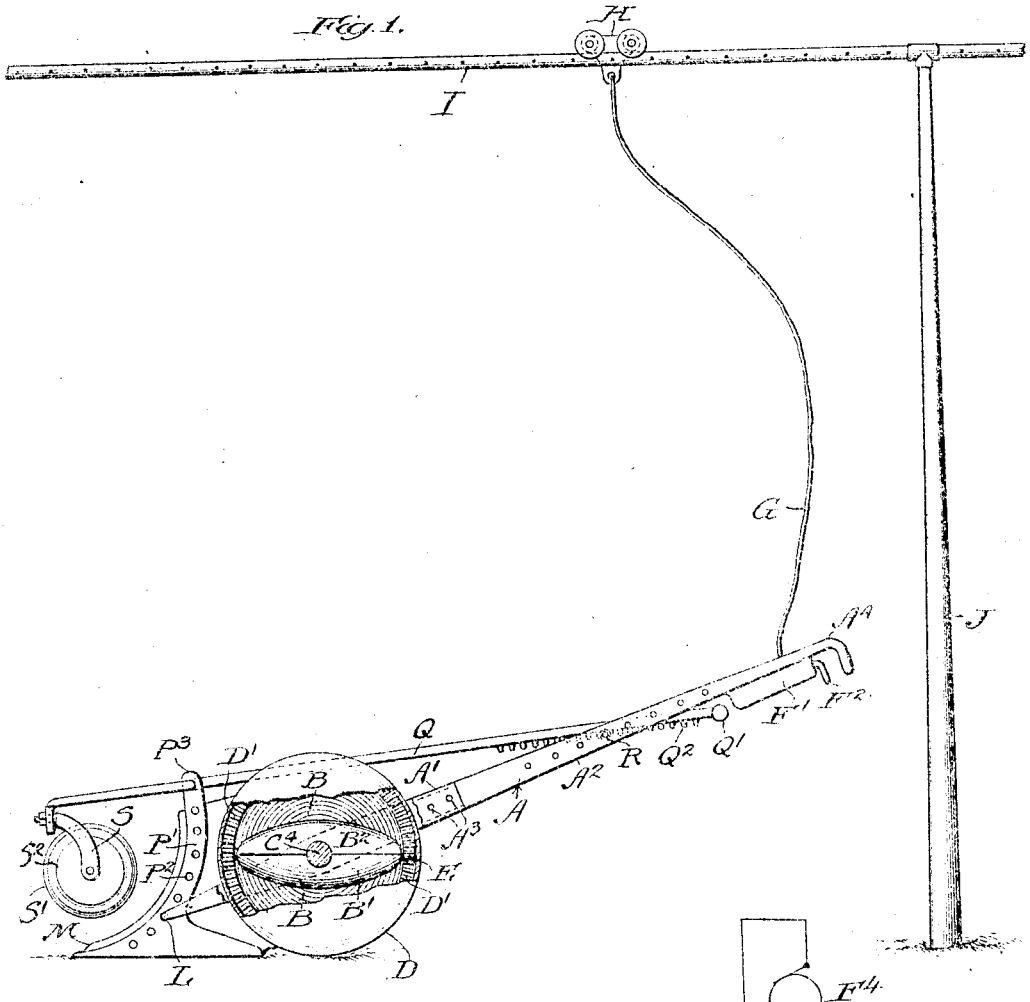
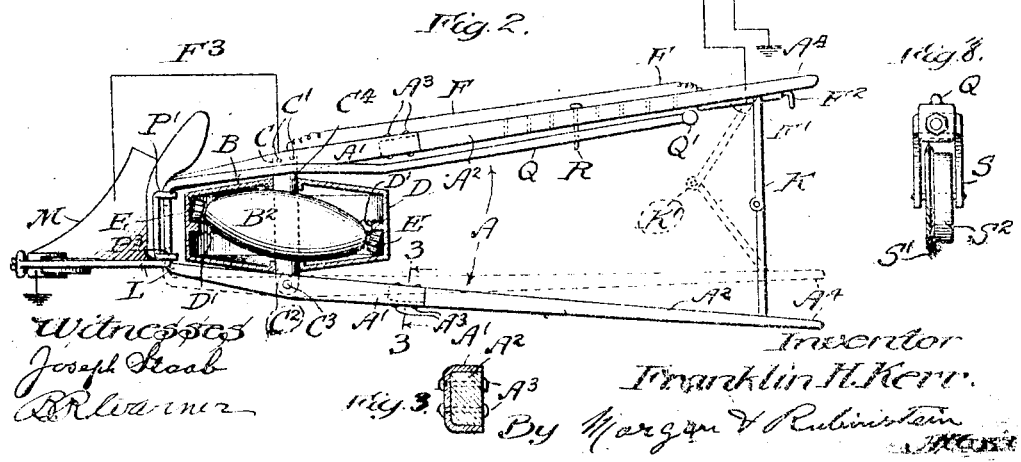

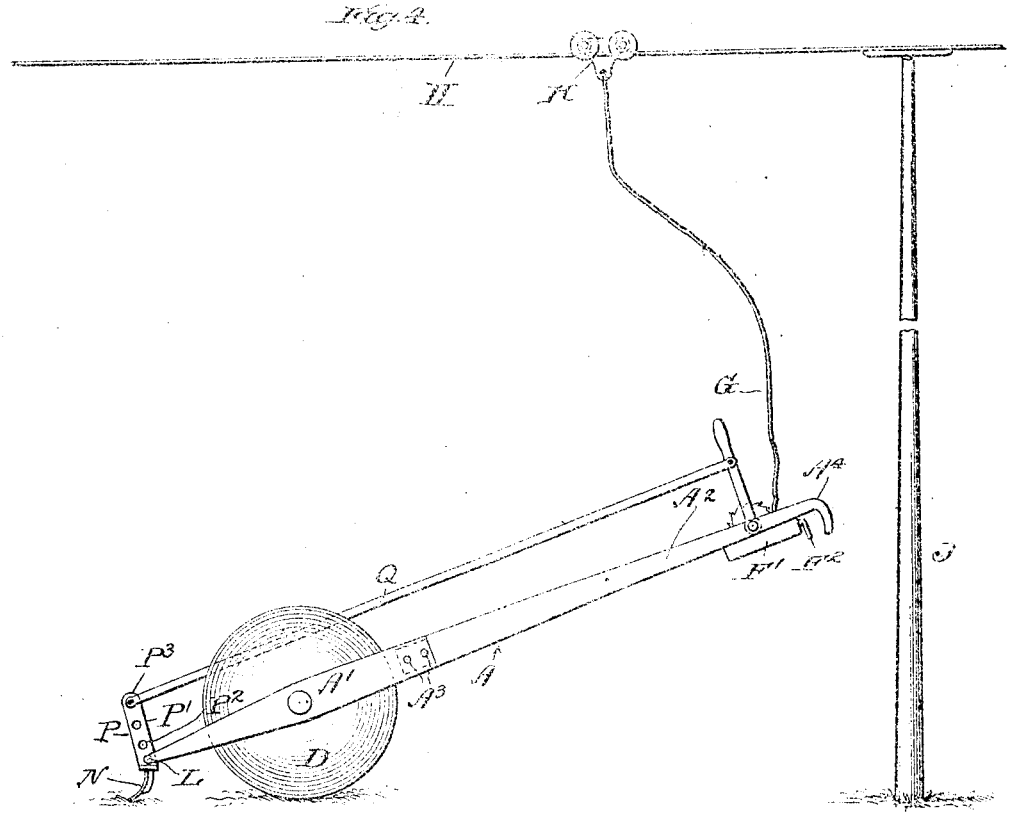
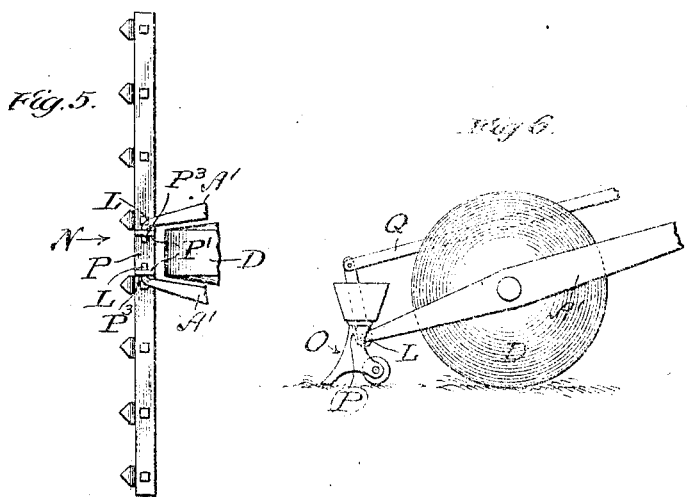
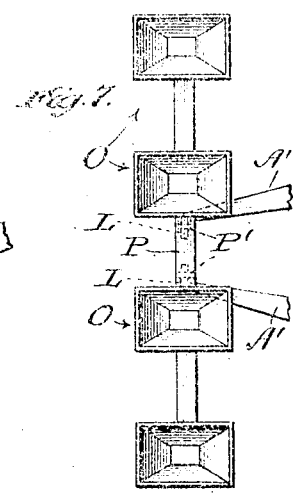

UNITED STATES PATENT OFFICE.

FRANKLIN H. KERR, OF CHICAGO, ILLINOIS.

FARM AND GARDEN TILLING MACHINE.

No. 926,498.

Specification of Letters Patent.

Patented June 29, 1909.

Application filed December 30, 1907. Serial No. 408,674.

*To all whom it may concern:*

Be it known that I, FRANKLIN H. KERR, a citizen of the United States, residing at 6006 Green street, in the city of Chicago, county of Cook, and State of Illinois, have invented a new and useful Improvement in Farm and Garden Tilling Machines, of which the following is a specification.

My invention relates to that class of machines propelled by man power, or drawn by draft animals: machines which are guided and controlled by the hands of the user applied to the handles at the rear end of the machine.

The object of my invention is to substitute electric motive power in place of man power and animal power, and to thereby produce an electrically propelled machine which is guided and controlled by the operator walking at the rear of the machine; a machine to which plows, cultivators, seeding and other tools and devices can be attached for cultivating harvesting and the transportation of products and materials of the farm and garden. The electric power to be supplied from some convenient station.

The manner in which I accomplish my object is described in the following specification and illustrated in the accompanying drawings in which—

Figure 1 is a side elevation of my invention with plow, cutter and gage wheel and trolley connection. Fig. 2 is a top plan view. Fig. 3 is a vertical cross sectional detail on line 3—3 Fig. 2. Fig. 4 is a side elevation showing a cultivator bar attached to the machine. Fig. 5 is a top plan view of the cultivator bar showing the means of connection of the machine and bar. Fig. 6 is a side elevation of part of the machine showing a seeder attached to the end of the machine. Fig. 7 is a top plan view of the seeder shown in Fig. 6, and Fig. 8 is an end view of the cutter and gage wheel shown in Figs. 1 and 2.

In the drawings A indicates the handles of the machine which are adapted in length to the size and particular purpose for which the machine is designed. The parts A¹ of these handles are made preferably of channel bars into which the wood parts A² of the handles are secured as shown in Figs. 2 and 3, by the bolts A³.

Supported between the parts A¹ of the handles is an electric motor B. The casing of this motor consists of a main bottom part B¹ and a top cover B².

Affixed to the bottom part B¹ are transverse side projections, one of these projections C is rigidly secured to the right handle by the bolts C¹ and the other projection C² is pivotally secured to the left handle by the pivot pin C³. The spaces on these projections between the motor case and the handles are journaled to form bearings C⁴ for the traction wheel D.

The driving shaft of the motor extends horizontally through both ends of the casing and is provided at each end with a pinion E. This shaft is set in a line which forms a slight angle to the central longitudinal line of the machine as shown in Fig. 2. The traction wheel D is formed of two halves adapted to inclose the motor B, and to run freely on the bearings C⁴ on the projections C and C². Forming part of the traction wheel is an internal double faced gear D¹ in which the pinions E of the motor shaft are meshed and by which the wheel D is rotated. The revolution of the motor shaft is reversible, that for the forward movement of the machine being toward the handle on the left. The electrical connection with the motor is made through the hollow projection C of the motor casing, by the electrical cables F which are attached at the other ends to the controller F¹ which is supported on the right side handle, the switch F² of which is within reach of the operator's fingers. The electric current for the motor is supplied by a cable G connected with the controller F¹ and with a trolley H which is supported on a trolley line I constructed of pipe as shown in Fig. 1, or of a regular trolley wire I—I as shown in Fig. 4. These conductors are supported on poles J set in parallel lines at suitable distances apart, between which the machine is operated. The electrical circuit is completed by the wire F³ which connects the plow or other tool with the motor and allows the current to pass therefrom to the ground, and thence back to the generator F⁴. At the ends A⁴ of the handles A and affixed thereto is a hinged bar K adapted when opened to lock the handles in the position required when the machine is in operation, and when partly closed as shown by the dotted lines K¹, the handles A are drawn together as shown by the dotted lines in Fig. 2. This movement is permitted by the pivotal connection of the left side handle with the projection C² on the casing of the motor, and allows the attachment to and removal of the various tools from the motor end of the machine. The motor ends of the handles are bent inward and form pivotal hooks L on which the tools are hung. The plow M, cultivator N, seeder O and other tools, are provided with a vertical channel bar P. The flanges P¹ of each of these bars have opposite perforations P² which are adapted to receive the pivot ends L of the handles A as shown on Figs. 1 and 2. The top end P³ of this channel bar is adapted to pivotally support a lever Q. The rear end Q¹ of this lever is within reach of the hand of the person operating the machine, and is adapted to be raised and lowered, and to be moved forward or back, the underside of this lever forms a rack Q², the teeth of which are adapted to engage the lock pin R which is supported in the left side handle. The other end of the lever is bent to the left and downward and is adapted to pivotally support fork S in which the circular cutter S¹ and gage wheel S² are free to rotate. Another means of connecting and operating the lever Q is shown in Fig. 4, but I prefer the construction shown in Figs. 1 and 2.

Having described the construction of my invention I now proceed to describe its operation and use.

The pipe line I shown in Fig. 1 supported on the poles J is in use for the purpose of irrigation. These pipes are perforated and set up in parallel lines from fifty to a hundred feet apart, and when not in use for that purpose can be easily connected with a railway trolley line or other means of electrical supply and thus form the conductor on which the trolley H is free to run. The trolley wire I—I is carried in parallel lines in the same way and forms a ready conductor where the pipe line is not required or desirable. This wire can be connected with a supply station at a distance. These means of electrical supply and connection being provided, the trolley H is placed on one side of the trolley line, and the machine is placed on the same side of the line. The cable G is of sufficient length to allow the machine to be worked outward from the line of poles to the center of the space between the trolley lines, the trolley is then changed to the opposite line, and the machine is worked from the center up to the line of poles supporting the wire or pipe on which the trolley has been placed. The machine and trolley is then moved to the other side of the line of poles and the space between that line and the one opposite, is worked the same way, and so on between all the lines erected.

The change of tools and their adjustment on the machine is as follows: The plow having been provided with the channel bar and thereby adapted for attachment to the machine, the hinge bar is forced into the position shown by the dotted lines K¹, Fig. 2. The channel bar of the plow is then adjusted between the motor ends of the handles, the pivot ends L being inserted in such of the apertures in A² as desired, the hinged bar is then forced into the locked position. The lever Q is then moved horizontally to give the angular position desired to the point of the plow or other tool attached to the machine. By the raising of the lever, and its adjustment by the insertion of the pin R in one of the apertures in A² in the handle to engage the rack Q², the height of the cutter, gage wheel or other tool or instrument secured in the end of the lever is adjusted.

It is obvious that a very large variety of tools, instruments and structures may be attached to the machine for useful purposes in farm and garden work and that by attaching the machine to a simple frame adapted to support the traction wheel above the ground and the use of a belt or other means of transmitting the motion of the wheel, connection can be made to many of the stationary machines used on a farm, garden or other place and their operation be secured thereby. It is also obvious that the movement of the machine on the one traction wheel is limited in direction and distance by the limitation of length and movement of the cable and trolley.

What I claim and desire to secure by Letters Patent is:

1. In a machine of the kind described, the combination consisting of a traction wheel; a peripherical gear within said wheel; an electric motor rotatably supported within said wheel; a pair of pinions on the shaft of said motor enmesh with said gear whereby said gear and wheel is rotated by said motor; a pair of handles attached to said motor, one on either side of said wheel whereby the movement of said machine is managed and controlled and to which farming and gardening implements can be attached; electric cables connected to said motor and to a controller; a controller on one of said handles; a trolley cable and a trolley connected with said controller and with an electric conductor whereby electric power is conveyed to said motor and said wheel rotated.

2. In a machine of the kind described, the combination consisting of a traction wheel, a peripherical gear affixed therein; an electric motor within said wheel; a gear on said motor enmesh with said gear in said wheel whereby the rotation of the motor is transmitted to said wheel; handles affixed to said motor whereby the movement of said wheel is directed and machine managed and controlled, said handles being adapted for the attachment thereto of agricultural implements; electric cables connecting said motor and a controller; an electric controller on said handles; a cable and trolley connecting said controller and an electric conductor on which said controller is suspended and free to travel, and whereby electric power is conveyed from a generator to said motor.

3. In a machine of the kind described, the combination consisting of a traction wheel having an internal gear; an electric motor within said wheel and geared thereto; a handle secured to said motor adapted to support agricultural implements, and by which said wheel and implements attached thereto are directed and controlled; electric cables connecting said motor and a controller; an electric controller supported on said handle whereby the movement of said motor and wheel is regulated; an electric cable connected to said controller and to a trolley; a trolley connected to said cable and an electric conductor on which said trolley is suspended and free to travel.

4. In a machine of the kind described, the combination consisting of a traction wheel; an electric motor within said wheel and geared thereto, and whereby said wheel is rotated; a pair of handles, one of said handles being pivotally and the other rigidly attached to said motor, said handles being adapted for the attachment thereto of agricultural and gardening implements, and whereby said machine is managed and controlled; electric cables connected to said motor and a switch; a switch supported on said handles connected with said cables; a trolley cable connected with said switch and a trolley; a trolley connected to said cable and to an electric conductor; an electric conductor on which said trolley is suspended and free to travel.

5. In a machine of the kind described, the combination of a traction wheel; an electric motor within said wheel and geared thereto; handles pivotally attached to said motor; a plow attached to said handles; electric cables connecting said motor to a controller; an electric controller supported on said handles; a trolley cable connecting said controller and a trolley; a trolley connected with said cable and with an electric conductor; and an electric conductor on which said trolley is suspended and free to travel.

6. In a machine of the kind described, the combination consisting of a traction wheel; an electric motor within said wheel and geared thereto; handles attached to said motor adapted to support an agricultural implement; an agricultural implement pivotally attached to said handles; a lever pivotally attached to said implement and to said handles, whereby the inclination of said implement in relation to said handles is adjusted; electric cables connecting said motor and a controller on said handles; an electric controller supported on one end of said handles; a cable connecting said controller and a trolley; a trolley connecting said cable and an electric conductor.

7. In a machine of the kind described, the combination consisting of a traction wheel having an internal radial toothed gear and cylindrical bearings; an electric motor pivotally supported in said bearings within said wheel, said motor having a longitudinal horizontal shaft and pinions thereon, said pinions being enmeshed with said gear; a pair of handles, one of which is affixed to a pivotal projection of said motor extending through and beyond one of said cylindrical bearings of said wheel, and the other being pivotally attached to a projection extending through the other bearing in the other side of said wheel, the front ends of said handles being adapted to hold an agricultural implement; electric cables connecting said motor and controller, a controller supported on said handles; and a cable and trolley connecting said controller and an electrical conductor adapted to supply electric power for said motor.

8. In a machine of the kind described the combination consisting of an electric motor driven traction wheel; handles pivotally attached to said wheel, said handles being adapted to support an agricultural implement and an electric motor, and to be used to guide said wheel; an electric motor supported on said handles; means connecting said wheel and motor adapted to transmit the movement of said motor to said wheel; means for transmitting electric power from a trolley wire to said motor; and means for controlling said motor.

9. In a machine of the kind described the combination consisting of a traction wheel; an electric motor geared thereto; handles axially attached to said wheel adapted to support said motor and to enable the operator to guide the movement of said wheel; an agricultural implement attached to said handles in front of said wheel; an electric controller on said handles; electric cables connecting said controller and motor; an electric cable connecting said controller and trolley; a trolley connecting said controller and an electric conductor as described.

10. In a machine of the kind described, the combination consisting of a motor driven traction wheel; a handle pivotally attached to said wheel, said handle being adapted to support an agricultural implement and a motor, and to enable the operator to guide and control the movement of said wheel; a motor supported on said handle connected to and adapted to rotate said wheel, and means for furnishing motive power to said motor.

11. An agricultural machine consisting of a pair of handles adapted to be held by the hands of the operator and whereby the movement of said machine is controlled and the machine operated, said handles converging from the rear to the front ends which terminate in pivot points which extend toward each other at right angles to the length of the handles; an electric motor having an inclosing case provided with pivotal side projections, one of which is hollow and affixed to one of said handles, and the other being pivotally attached to the other handle, each of said projections being journaled adjacent to the body of said case; a traction wheel inclosing said motor, having cylindrical bearings adapted to fit said journaled parts of said projections on said motor case; a double faced circumferential gear within said wheel; a pair of pinions affixed on opposite ends of the shaft of said motor, said pinions being enmeshed with said gear, whereby said wheel is rotated; electrical cables connecting said motor and a controller; an electric controller supported on one of said handles; a plow having a vertical channel bar the flanges thereof having a series of apertures adapted for the insertion of said pivotal points on said handles; a lever pivotally supported in said channel bar, one end of said bar being adapted to support a gage wheel and cutter wheel in front of said plow, the other end of said lever having a rack part adjustable on a pin supported in one of said handles and whereby the positions of said plow and wheel on said lever can be adjusted; a hinged rod connecting said handles whereby said handles can be locked in the position for holding said plow and unlocked for its release from the pivot points of said handles; and cable connecting said controller and a trolley; a trolley connecting said cable and an electric conductor; an electric conductor on which said trolley is suspended and free to travel, said conductor being connected with an electric supply adapted to operate said motor and wheel.

FRANKLIN H. KERR.

Witnesses:
THOMAS J. MORGAN,
JOSEPH STAAB.